United States Patent
Raghu et al.

(10) Patent No.: US 9,894,512 B2
(45) Date of Patent: Feb. 13, 2018

(54) MODE-SPEED SWITCHING FOR EXPLOITING HIGH-SPEED IN BLE-MESH SYSTEMS

(71) Applicant: Texas Instruments Incorporated, Dallas, TX (US)

(72) Inventors: Arvind Kandhalu Raghu, Plano, TX (US); Kaichien Tsai, Allen, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/494,103

(22) Filed: Apr. 21, 2017

(65) Prior Publication Data
US 2017/0318453 A1  Nov. 2, 2017

Related U.S. Application Data

(60) Provisional application No. 62/328,387, filed on Apr. 27, 2016.

(51) Int. Cl.
| | |
|---|---|
| H04B 7/00 | (2006.01) |
| H04M 1/00 | (2006.01) |
| H04W 8/22 | (2009.01) |
| H04W 4/00 | (2009.01) |
| H04L 12/26 | (2006.01) |
| H04L 12/24 | (2006.01) |
| H04W 84/18 | (2009.01) |

(52) U.S. Cl.
CPC ............. *H04W 8/22* (2013.01); *H04L 41/082* (2013.01); *H04L 43/10* (2013.01); *H04L 43/16* (2013.01); *H04W 4/008* (2013.01); *H04W 84/18* (2013.01)

(58) Field of Classification Search
CPC ........... H04B 5/02; H04B 7/26; H04W 4/008; H04W 48/10; H04W 84/12; H04M 1/7253; H04M 2250/02
USPC ............... 455/41.1, 41.2, 41.3, 552.1, 553.1; 370/311, 328
See application file for complete search history.

(56) References Cited

U.S. PATENT DOCUMENTS 9,538,356 B2 *  1/2017  Hughes ................. H04W 48/10
2011/0021142 A1  1/2011  Desai et al.
(Continued)

*Primary Examiner* — Quochien B Vuong
(74) *Attorney, Agent, or Firm* — Ronald O. Neerings; Charles A. Brill; Frank D. Cimino

(57) ABSTRACT

A BLE-Mesh device includes a controller coupled to a memory and to a transceiver adapted to be coupled to an antenna, wherein the controller implements an applications layer including BLE and Mesh applications, and a BLE stack and a mesh stack. The BLE-Mesh device has a switchable high-speed and low-speed mode and a speed switching algorithm for implementing a method of communications in BLE-mesh network. A broadcast ping is sent to neighborhood devices with a time to live (TTL)=1. A manufacturer's ID is analyzed to identify in a manufacturer's ID field in pongs received to determine a higher-speed capable device or a lower-speed device. A higher-speed data rate is utilized for mesh communications if a percentage of higher-speed capable devices is≥a threshold percentage or a lower-speed data rate is utilized for the mesh communications if the percentage of higher-speed capable devices is<the threshold percentage.

18 Claims, 4 Drawing Sheets

(56) References Cited

U.S. PATENT DOCUMENTS

| | | | |
|---|---|---|---|
| 2014/0179276 A1* | 6/2014 | Kang | H04W 4/008 455/41.2 |
| 2015/0163748 A1* | 6/2015 | Hrabak | H04W 52/0245 455/41.2 |
| 2015/0195857 A1* | 7/2015 | Pan | H04W 76/02 455/41.3 |
| 2016/0088424 A1* | 3/2016 | Polo | H04W 4/008 455/41.1 |
| 2017/0188181 A1* | 6/2017 | Jin | H04W 4/008 |

* cited by examiner

| PING FIELD | OFFSET | SIZE | NOTES |
|---|---|---|---|
| InitTTL | 0 | 1 | INITIAL TIME TO LIVE (TTL) VALUE USED WHEN SENDING THIS MESSAGE |

| PONG FIELD | OFFSET | SIZE | NOTES |
|---|---|---|---|
| InitTTL | 0 | 1 | INITIAL TIME TO LIVE (TTL) VALUE USED WHEN SENDING THIS MESSAGE |
| TTLReceived | 1 | 1 | TTL OF THE TRIGGERING MESSAGE ON ITS ARRIVAL |

FIG. 2

| BYTE | VALUE | DESCRIPTION |
|---|---|---|
| 0 | 0x03-0x1F | LENGTH OF DATA |
| 1 | 0xFF | MANUFACTURER-SPECIFIC DATA FLAG |
| 2 | 0x0D | COMPANY ID |
| 3 | 0x00 | EXAMPLE, 0X000D → TEXAS INSTRUMENTS |
| 4-31 | - | USER DEFINED DATA (OPTIONAL) |

FIG. 3

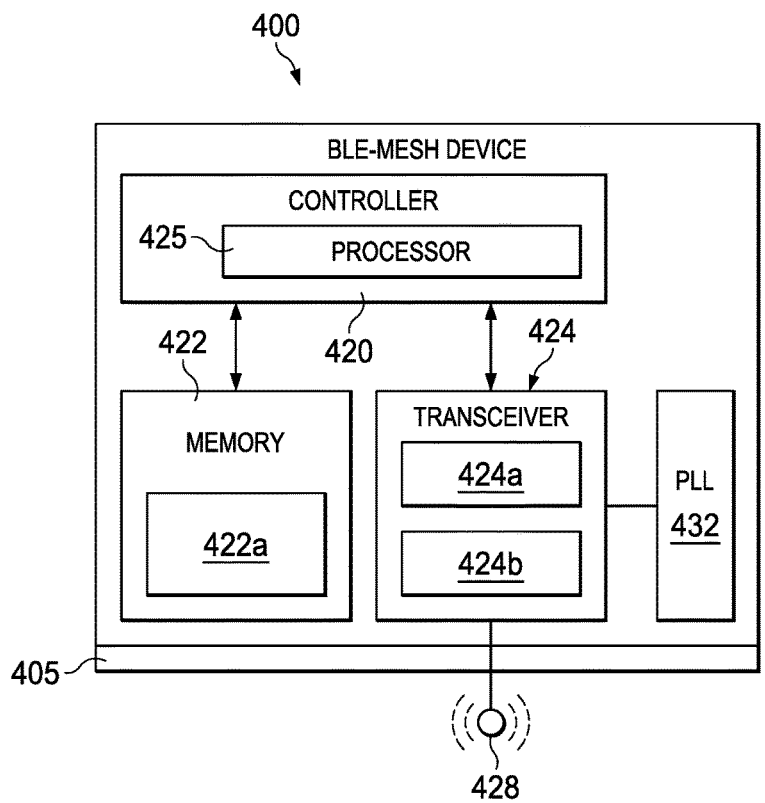

FIG. 4A

MODE-SPEED SWITCHING FOR EXPLOITING HIGH-SPEED IN BLE-MESH SYSTEMS

CROSS REFERENCE TO RELATED APPLICATIONS

This application and the subject matter disclosed herein claims the benefit of Provisional Application Ser. No. 62/328,387 entitled "Exploiting High-Speed in BLE-Mesh Systems" filed Apr. 27, 2016, which is herein incorporated by reference in its entirety.

FIELD

Disclosed embodiments relate generally to wireless communications, more specifically to Bluetooth Low Energy (BLE) automation mesh network (BLE-Mesh) communications.

BACKGROUND

BLE-Mesh is a wireless personal area network (WPAN) technology that uses a flooding-based packet protocol that with packet retransmission extends the range of BLE devices by including the ability to send messages to and amongst groups of devices. The devices in the BLE-Mesh network can support both BLE and BLE-mesh, but not necessarily both. A rebroadcasting mesh network works by flooding each message to all device nodes in the network through broadcasts.

The nodes in the mesh network all share a set of indexed data slots. Each time a device receives a broadcast message from another device in the mesh, the device repeats the message (rebroadcasts it), enabling its neighboring devices to 'hear' the new message. The neighboring devices rebroadcast this message to all their neighbors, and the process is repeated until all devices in the Mesh have received the same message. Flooding thus enables wireless devices to 'talk' to each other without being within a direct radio range, as devices between them help by relaying the messages. In a typical WPAN there are edge device(s) which are battery powered, relay devices that are always on as they are always in the listening mode, and there are functional end device(s), such as lights.

Each packet contains the sender's source address (SRC) for packet addressing as well as a packet sequence (SEQ) number, and the payload is also tagged with the type of message that is called a model. The packet also contains the address to whom (which device node) the packet is addressed. The packet generally specifies a unique address of each device in the mesh than can be derived from the device's Universally Unique Identifier (UUID). The SEQ number is a field indicating the sequence number of a message, which prevents device nodes from relaying packets that they have received before. For example a single bit for a single bit SEQ where the SEQ number bit is initialized to 0 by the device upon entering the connection state, and where the SEQ number bit is changed (from 0 to 1 or vice versa) for each new packet sent by the device, but the SEQ number bit is not changed when a packet is relayed (resent, so not new) by the device. Models are application implementations, such as a lighting model that defines the command to dim a light, or get status.

A network device that receives the packet checks the intended address to determine if it is the intended receiver of the packet, and if so begins processing the information within the packet. Devices that hear the packet but are not the intended receiver discard them, or send them back out as a broadcast. This relay function is possible, since a time-to-live (TTL) counter is used so that the packet will only be repeated so many times and since packets that come around are being recognized as already received, they will not be repeated. With this TTL-based packet relaying arrangement flooding the mesh can be avoided.

SUMMARY

This Summary is provided to introduce a brief selection of disclosed concepts in a simplified form that are further described below in the Detailed Description including the drawings provided. This Summary is not intended to limit the claimed subject matter's scope.

The BLE-Mesh specification may utilize a data rate that is lower than the data rate supported by some commercially available BLE-Mesh devices that may be in the mesh network. For example, a maximum Physical Layer (PHY) data rate utilized throughout the mesh network may be 1 Mbit/s. Thus, although there may be BLE-Mesh devices that provide a data rate >1 Mbit/s in the mesh network, there is no known technique for data rate switching to support higher data rate network communications with such higher data rate BLE-mesh devices.

Disclosed speed switching is for exploiting high-speed in BLE-Mesh networks which applies to relay devices supporting both a higher-speed and lower-speed mode to enable exploiting the high-speed mode when the high-speed mode is determined to supported by the neighboring device nodes, and to utilize the lower-speed mode when the high-speed mode is determined to not be supported by the neighboring device nodes. The higher-speed data rate can be at least 50% higher than the lower-speed data rate. High-speed data rate operation when supported is implemented to reduce network congestion by improving multi-hop latency, and can also be used for faster over the air (OTA) firmware updates to the neighboring devices. Disclosed methods are especially useful for large scale BLE-mesh deployments which as known in the art are prone to congestion.

Disclosed embodiments include a BLE-Mesh device including a controller having a processor and a transceiver, wherein the controller implements an applications layer including BLE applications and Mesh applications, and a BLE stack and a mesh stack. The BLE-Mesh device has a switchable high-speed and low-speed mode and a speed switching algorithm for implementing a method of communications in BLE-mesh network. A broadcast ping is sent to neighborhood devices with a TTL=1. A manufacturer's ID is analyzed to identify a manufacturer's ID field in pongs received to determine whether a higher-speed capable device or a lower-speed device. A higher-speed data rate is utilized for mesh communications if the percentage of higher-speed capable devices is≥a threshold percentage, or a lower-speed data rate is utilized for the mesh communications if the percentage of higher-speed capable devices is<the threshold percentage.

BRIEF DESCRIPTION OF THE DRAWINGS

Reference will now be made to the accompanying drawings, which are not necessarily drawn to scale, wherein:

FIG. 2 shows an example ping model that example embodiments can implement for broadcast pings.

FIG. 3 shows how an explicit indication can be used for OTA firmware updates using proprietary packets as an explicit indicator, here using the Manufacturer's specific data type 0XFF in broadcast data.

FIG. 4A is a block diagram schematic of an example disclosed BLE-Mesh device that can implement disclosed speed switching for exploiting high-speed BLE-Mesh networks, according to an example embodiment.

DETAILED DESCRIPTION

Figure 1:
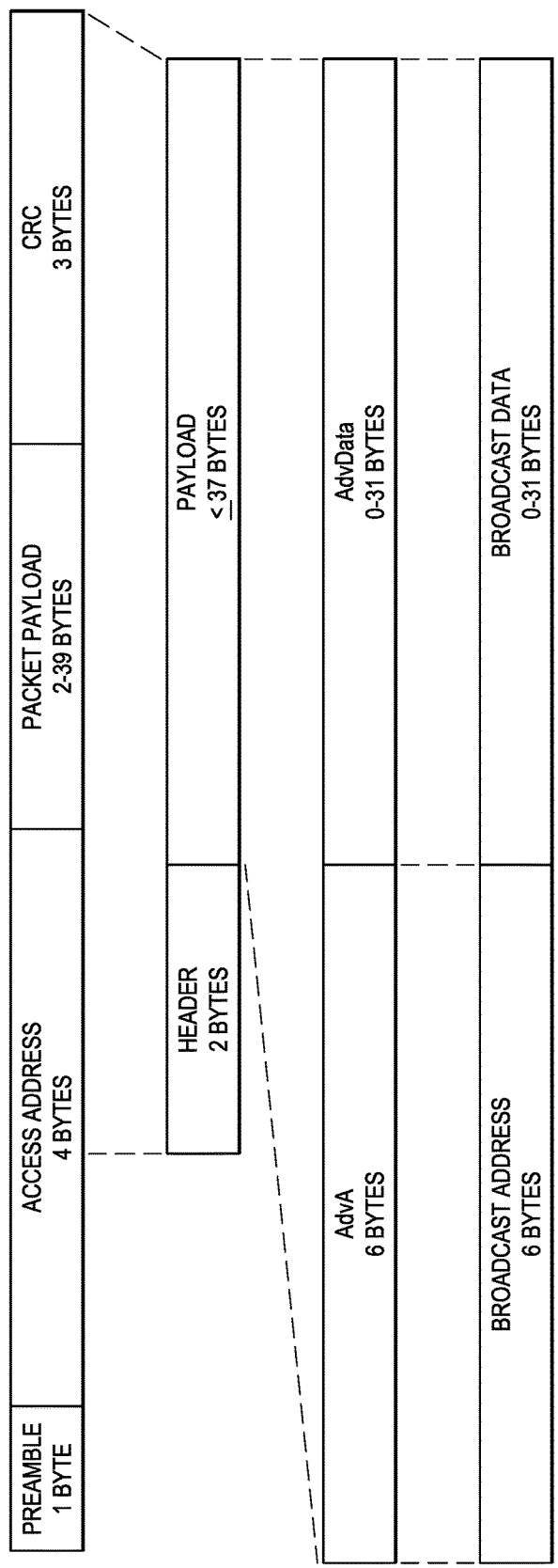
FIG. 1 shows the various fields in an example mesh packet.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows the various fields in an example mesh packet that aids in explaining disclosed detecting higher-speed capable devices nodes in a BLE-mesh network. In the packet payload field there is a device address shown by example as a 6 byte broadcast address which includes the BLE-Mesh device's manufacturer ID (shown as the Company ID in FIG. 3) of the BLE-Mesh device that is used in disclosed embodiments to determine whether each of the neighborhood BLE-Mesh devices is a higher-speed or is not high-speed device (a lower-speed device). For public device addresses there can be a 48-bit address obtained from Institute of Electrical and Electronics Engineers (IEEE) Registration authority, where bits 0-23 are device manufacturer Company assigned, and bits 24-47 have the Company's ID which can be used to determine the manufacturer of the BLE-Mesh device. The receiving device may have a table with a list of some manufacturer IDs showing whether each listed manufacturer manufactures higher-speed or lower-speed devices. The BLE-Mesh device receiving knows its manufacturer ID and what speeds are supported. So only if a neighbor BLE-Mesh device is from the same manufacturer as the receiving BLE-Mesh device will be maintained. Any other manufacturer ID information is generally irrelevant to disclosed embodiments.

FIG. 2 shows an example ping model that example embodiments can implement to detect the presence of neighborhood high-speed device BLE-Mesh nodes. Received pongs from neighboring devices responsive to received pings sent as broadcasts are used herein to determine the neighboring device type as being higher-speed capable or lower-speed (not high-speed capable). For the ping packet and pong packet one can set the initial TTL which is shown in FIG. 2 to be set to 1. The TTL may be implemented as a counter or timestamp attached to or embedded in the packet data. A counter for the BLE-Mesh device may comprise hardware and/or software configured to maintain and increment a count value. It may, for example comprise a number of flip-flops, or it may be implemented by firmware running on a processor (e.g., a microcontroller). Once the prescribed event count or timespan has elapsed, the packet is discarded. In practice, the TTL number is reduced by one on every hop, so that a TTL=1 means only one hop so it only goes to 1-hop immediate neighbors and not beyond.

The device address range in the pong packet is analyzed by the ping sender device to determine the manufacturer's ID which is used to decide whether or not the neighboring BLE-Mesh device is a high speed capable device. The relay device performing the ping can compile and maintain a neighborhood list with the high speed capable vs. non-high speed capable device nodes marked in the list. If the same neighboring BLE-Mesh device is from the same manufacturer then the receiving BLE-Mesh device knows what speeds are supported by its neighbor BLE-Mesh device.

From the pongs the communication speed (device data rate) can then be determined. The non-high speed device nodes will not 'hear' high-speed ping packets. There are various methods to flood (relay) packets. One can send pings in only high-speed. This results in the non-high speed device nodes not decoding packets, thus not sensing pongs responsive to the ping. However, also certain high-speed device nodes that are connected only through non-high speed device nodes will not receive the ping packet either.

Another method to flood relay packets is to send separate pings to provide a ping in both the regular speed (e.g., 1 MB/sec) and in the high-speed (e.g., 2 MB/sec). However, this generally causes additional latency and overhead unnecessarily. Another method to flood relay packets is to use a relatively simple algorithm that comprises picking if a device node should relay in regular speed or in high speed. A relay-type index is maintained in a neighbor list identifying the respective BLE-Mesh device nodes as being high-speed capable or not high-speed capable.

If the number of neighbor high-speed capable BLE-Mesh device nodes≥a threshold percentage (e.g., a fixed percentage≥50%), then it can be determined for the BLE-Mesh device to use relay-type index=1, thus to use high-speed, else 0 and thus use the lower speed. The threshold percentage can be a configurable parameter which can be set to any percentage at deployment time, or it can be dynamically set at run time by the network administrator. In the case of mixed high-speed/regular speed BLE-Mesh neighboring devices only the supported speed devices will receive the packets. If the destination BLE-Mesh device node is a neighbor, then one can base the determination of high-speed capable device or not based on the destination node type. If the packet destination is an immediate neighbor, direct communication with that BLE-Mesh device is possible. Hence one can directly use the highest speed supported by the device. Otherwise, if there are sufficient number reflected in the threshold percentage of neighbor devices capable of high-speed the relay-type is 1, then one can use the higher-speed, else use the regular lower-speed.

The percentage of neighborhood higher-speed capable devices can change during network operations if the BLE-Mesh devices in the network are mobile or if new devices are added to the network, and this change can result in being on a different side relative to the threshold percentage. Responsive to a change in the percentage of neighborhood higher-speed capable devices which results in moving to a different side relative to the threshold percentage, the BLE-Mesh device for its mesh communications can change from utilizing a higher-speed data rate to a lower-speed data rate in the case of added lower-speed device(s), or from utilizing a lower-speed data rate to a higher-speed data rate in the case of added higher-speed capable device(s).

FIG. 3 shows how an explicit indication in a custom (proprietary) packet can be used for OTA firmware updates having the device manufacturer's ID as an explicit indicator. In FIG. 3 the manufacturer specific data type 0XFF in the broadcast data field of the packet is used to determine whether the device is a high-speed capable device. The indication of high-speed capable device nodes once determined can be used for OTA updates. The OTA update needs to occur between a pair of devices. Accordingly, the fastest common supported data speed should be selected.

Benefits of disclosed speed switching for exploiting high-speed in BLE-mesh systems includes improvement in less contention, thereby providing greater robustness. There is also a reduction in congestion which improves scalability and latency. Disclosed speed switching can be used for faster OTA firmware updates.

Disclosed speed switching can be detected in a variety of ways. The switching of the BLE-Mesh device between different speeds can be detected by tracking that particular device communication. A high-speed capable BLE-mesh device when using the high-speed mode can receive high-speed mesh packets and thereby be detected by using a packet sniffer at the high speed rate. For tracking, the unique device address in the packet can be used (that is in the packet besides the manufacturer's ID) in conjunction with multiple packet sniffers operating at different data rates. If the BLE-mesh device is speed switching, then packets from that BLE-mesh device will be observed on the different rate sniffers.

FIG. 4A shows a system block diagram representation for an example BLE-Mesh device 400 that generally conforms to the BLE communications standard. The BLE-Mesh device 400 is generally formed on an integrated circuit (IC) shown formed on a substrate 405 having a semiconductor surface. The BLE-Mesh device 400 may be any device that can engage in BLE communications. Such devices may be, may include, or may be a part of, mobile phones such as smartphone, tablets, computers, personal digital assistants, and household items with communication capabilities such as door knobs, window blinds, and motion sensors. The BLE-Mesh device 400 communicates in a BLE-mesh network along with as plurality of other BLE devices to a network (e.g., the Internet) that is coupled to a central authority database that is generally stored on a server.

The BLE-Mesh device 400 comprises a controller 420 including a processor 425, a memory 422 including software 422a for disclosed speed switching for exploiting a high-speed BLE-Mesh networks algorithm, and a transceiver 424 including an RF driver 424a that is adapted to be coupled to an antenna 428. The processor 425 can comprises a digital signal processor (DSP) or microcontroller. The controller 420 implements a BLE stack 460 for BLE operations and a mesh stack 454 for mesh operations. The transceiver 424 is also shown including hardware comprising digital logic 424b that can be used as an alternative to software 422a for implementing a disclosed speed switching for exploiting high-speed BLE-Mesh networks algorithm. As known in the art the transceiver 424 includes a transmitter and a receiver.

The transmitter generally comprises a media access control (MAC) module, an encoder, a modulator, an Inverse Fast Fourier Transform (IFFT) unit, a digital to analog conversion (DAC)/filter module, and an RF/antenna module. The receiver generally comprises an RF/antenna unit, an analog to digital conversion (ADC)/filter unit, a FFT unit, a demodulator, a decoder, and a MAC module.

The memory 422 is more generally configured to store information including data, instructions, or both. The memory 422 may be any storage medium accessible by the controller 420, such as a read only memory (ROM), a random access memory (RAM), a register, cache memory, or magnetic media device such as internal hard disks and removable disks. A phase lock loop (PLL) 432 is also provided for purposes including mixing and frequency synthesis.

The controller 420 is coupled to the memory 422 and to the transceiver 424. In some implementations, the transceiver 424 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform ADC, DAC, filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at the radio frequencies of the BLE-mesh network. The higher-speed data rate utilized by the BLE-Mesh device 400 for higher-speed data rate communications may be in the 2.4 GHz to 2.483-GHz frequency band and the lower-speed data rate may in a frequency band in the range from 1.0 GHz to 1.5 GHz.

Figure 4B:
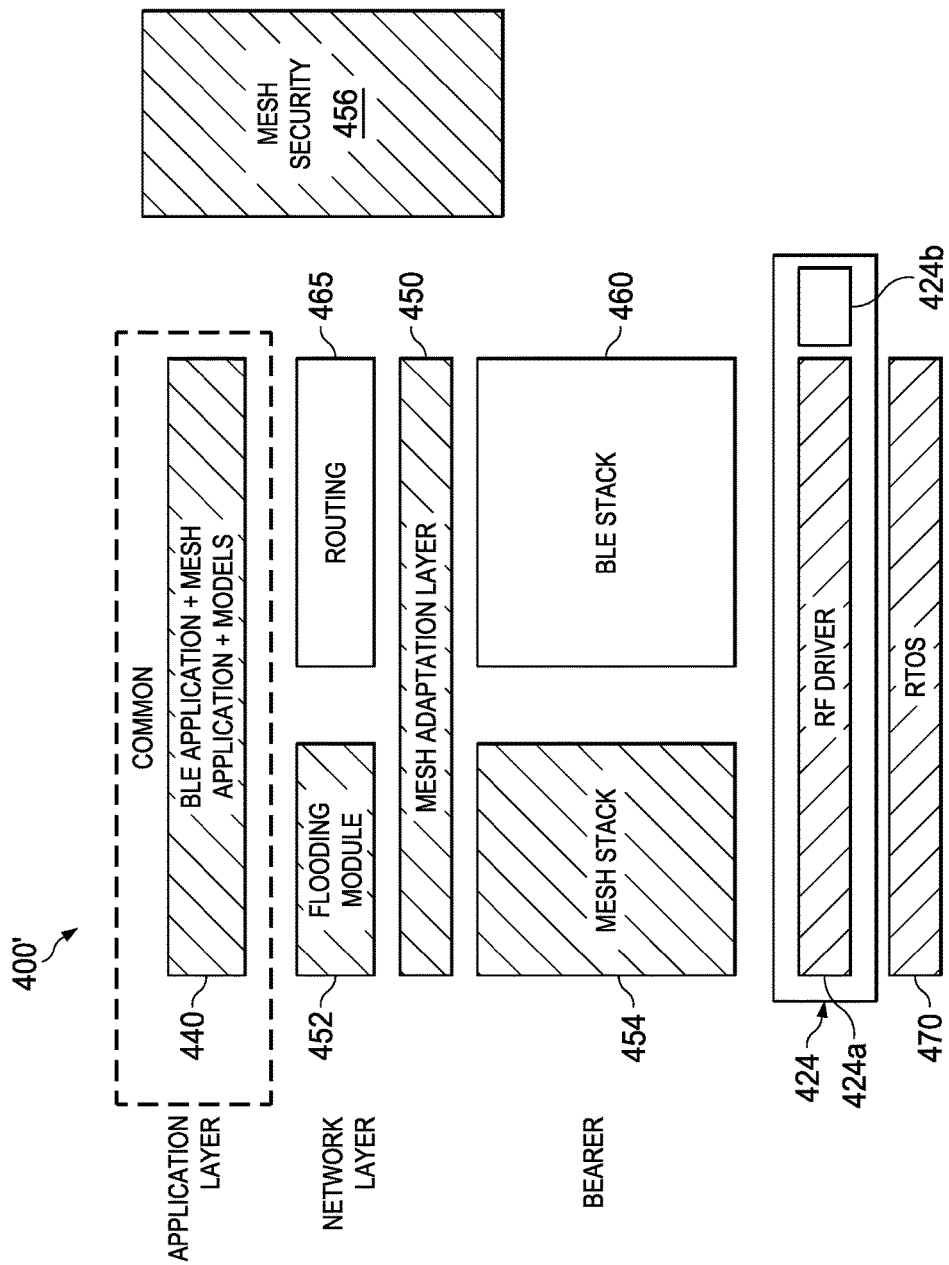
FIG. 4B is a functional layer depiction of the BLE-Mesh device shown in FIG. 4A.

FIG. 4B is a functional layer depiction of the BLE-Mesh device 400 shown in FIG. 4A now shown as 400' that includes an application layer including BLE applications and mesh application models 440. All blocks above the RF driver 424a are generally software (SW) running on the processor 425 shown in FIG. 4A in memory 422 (typically stored in flash RAM or ROM).

The Mesh adaptation layer 450 formats for BLE or Mesh accordingly and signals appropriate for the particular application. The RF driver 424a includes driver Application Programming Interface (API) software and the radio itself in hardware. There is also a flooding module 452, Mesh stack 454 including Mesh security, all for mesh communications. There is also a routing block 465 that is different from the flooding module-based mesh. If routing is present, then the routing block 465 at each node maintains neighbor tables and messages that are sent via deterministic paths to reach a specific destination. In a flooding-based mesh controlled by flooding module, messages are broadcast to all devices across the network over multiple hops.

BLE-Mesh device 400' also includes a BLE stack 460. BLE stack 460 controls connections and advertising in Bluetooth, and describes how data is exchanged from two connected devices for BLE. BLE-Mesh device 400' is also shown having a real-time operating system (RTOS) 470. RTOS 470 scales from a low-footprint, real-time preemptive multi-tasking kernel to a complete RTOS with additional middleware components including a power manager, TCP/IP and USB stacks, an embedded file system and device drivers.

Figure 5:
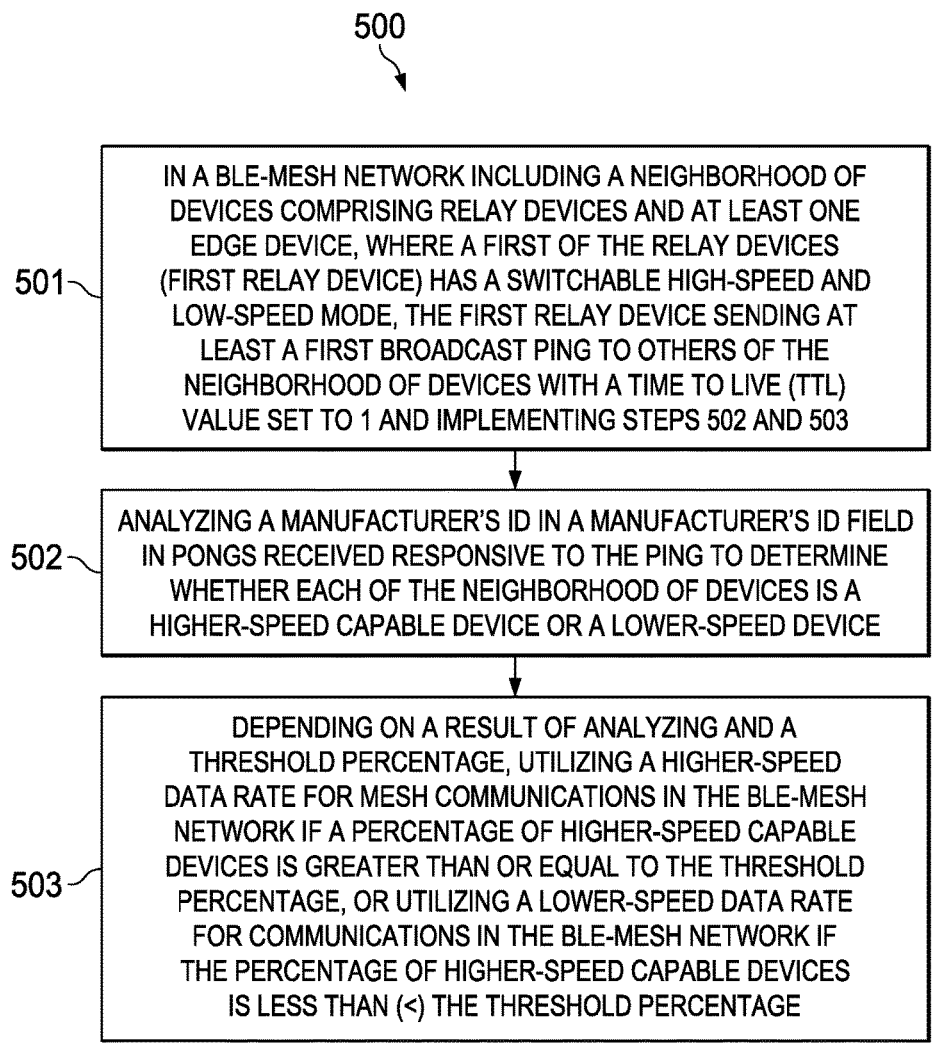
FIG. 5 is a flowchart for an example method of speed switching for exploiting high-speed in a BLE-Mesh network including a neighborhood of devices comprising relay devices and at least one edge device, where a first of the relay devices has a switchable high-speed and low-speed mode, according to an example embodiment.

FIG. 5 is a flowchart for an example method 500 of communications in BLE-mesh network including a neighborhood of devices comprising relay devices and at least one edge device, where a first of the relay devices (first relay device) has a switchable high-speed and low-speed mode, according to an example embodiment. Step 501 comprises sending at least a first broadcast ping to others of the neighborhood of devices with a TTL value set to 1. Step 502 comprises analyzing a manufacturer's ID in a manufacturer's ID field in pongs received responsive to the ping to determine whether each of the neighborhood of devices is a higher-speed capable device or a lower-speed device. Step 503 comprises depending on a result of analyzing and a threshold percentage, utilizing a higher-speed data rate for mesh communications in the BLE-mesh network if a percentage of higher-speed capable devices is greater than or equal to the threshold percentage, or utilizing a lower-speed data rate for communications in the BLE-mesh network if the percentage of higher-speed capable devices is less than (<) the threshold percentage.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of communications in BLE-mesh network including a neighborhood of devices comprising relay devices and at least one edge device, comprising a first of said relay devices (first relay device) having a switchable high-speed mode and low-speed mode, said first relay device comprising:
   sending at least a first broadcast ping to others of said neighborhood of devices with a time to live (TTL) value set to 1;
   analyzing a manufacturer's ID in a manufacturer's ID field in pongs received responsive to said first ping to determine whether each of said others of said neighborhood of devices is a higher-speed capable device or a lower-speed device;
   depending on a result of analyzing and a threshold percentage, utilizing a higher-speed data rate for mesh communications in said BLE-mesh network if a percentage of said higher-speed capable devices is greater than or equal to (≥) said threshold percentage or utilizing a lower-speed data rate for communications in said BLE-mesh network if said percentage of said higher-speed capable devices is less than (<) said threshold percentage.

2. The method of claim 1, wherein said threshold percentage is a fixed percentage that is greater than or equal to (≥) 50%.

3. The method of claim 1, wherein said first ping comprises a ping sent at said higher-speed data rate and another ping sent at said lower-speed data rate.

4. The method of claim 1, wherein said utilizing comprises using said higher-speed data rate for said mesh communications, further comprising performing an over the air (OTA) firmware upgrade for said others of said neighborhood of devices which are said higher-speed capable devices using said higher-speed data rate.

5. The method of claim 1, further comprising responsive to detecting a change in said percentage of said higher-speed capable devices, switching between said higher-speed data rate and said lower-speed data rate.

6. The method of claim 1, wherein a speed switching for exploiting high-speed BLE-Mesh networks algorithm implements said method, said algorithm comprising software stored in a memory that is implemented by a processor.

7. The method of claim 1, wherein a speed switching for exploiting high-speed BLE-Mesh networks algorithm implements said method, and wherein said algorithm comprises hardware including digital logic.

8. The method of claim 1, wherein a data rate of said higher-speed data rate is at least 50% higher than a data rate of said lower-speed data rate.

9. The method of claim 1, further comprising said first relay device maintaining a table with a list of a plurality of said manufacturer's IDs showing whether each listed manufacturer manufactures said higher-speed capable devices or said lower-speed devices.

10. A BLE-Mesh device, comprising:
    a controller comprising a processor coupled to a memory and to a transceiver, an RF driver for driving said transceiver, said transceiver adapted to be coupled to an antenna, said controller implementing an applications layer including BLE applications and Mesh Applications, and a BLE stack for BLE operations and a mesh stack for mesh operations;
    said BLE-Mesh device having a switchable high-speed and low-speed mode and a speed switching for exploiting high-speed BLE-Mesh networks algorithm for implementing a method of communications in BLE-mesh network including a neighborhood of devices comprising relay devices and at least one edge device, comprising:
    sending at least a first broadcast ping to others of said neighborhood of devices with a time to live (TTL) value set to 1;
    analyzing a manufacturer's ID in a manufacturer's ID field in pongs received responsive to said first ping to determine whether each of said others of said neighborhood of devices is a higher-speed capable device or a lower-speed device;
    depending on a result of analyzing and a threshold percentage, utilizing a higher-speed data rate for mesh communications in said BLE-mesh network if a percentage of said higher-speed capable devices is greater than or equal to (≥) said threshold percentage or utilizing a lower-speed data rate for communications in said BLE-mesh network if said percentage of said higher-speed capable devices is less than (<) said threshold percentage.

11. The BLE-Mesh device of claim 10, wherein said threshold percentage is a fixed percentage that is greater than or equal to (≥) 50%.

12. The BLE-Mesh device of claim 10, wherein said algorithm comprises software stored in said memory that is implemented by said processor.

13. The BLE-Mesh device of claim 10, wherein said algorithm comprises hardware including digital logic.

14. The BLE-Mesh device of claim 10, wherein said BLE-Mesh device includes a battery for battery powering.

15. The BLE-Mesh device of claim 10, said algorithm further comprising responsive to detecting a change in said percentage of said higher-speed capable devices, switching between said higher-speed data rate and said lower-speed data rate.

16. The BLE-Mesh device of claim 10, wherein said BLE-Mesh device is formed on an integrated circuit (IC)

comprising a substrate having a semiconductor surface, wherein said processor comprises a digital signal processor (DSP) or a microcontroller.

17. The BLE-Mesh device of claim 10, said algorithm further comprising maintaining a table with a list of a plurality of said manufacturer's IDs showing whether each listed manufacturer manufactures said higher-speed capable devices or said lower-speed devices.

18. The BLE-Mesh device of claim 10, wherein a data rate of said higher-speed data rate is at least 50% higher than a data rate of said lower-speed data rate.

* * * * *